Feb. 26, 1957  H. O. SCHJOLIN  2,782,871
WHEEL STRUCTURE WITH NON-ROTATING HUB CAP
Filed Sept. 25, 1953  2 Sheets-Sheet 1
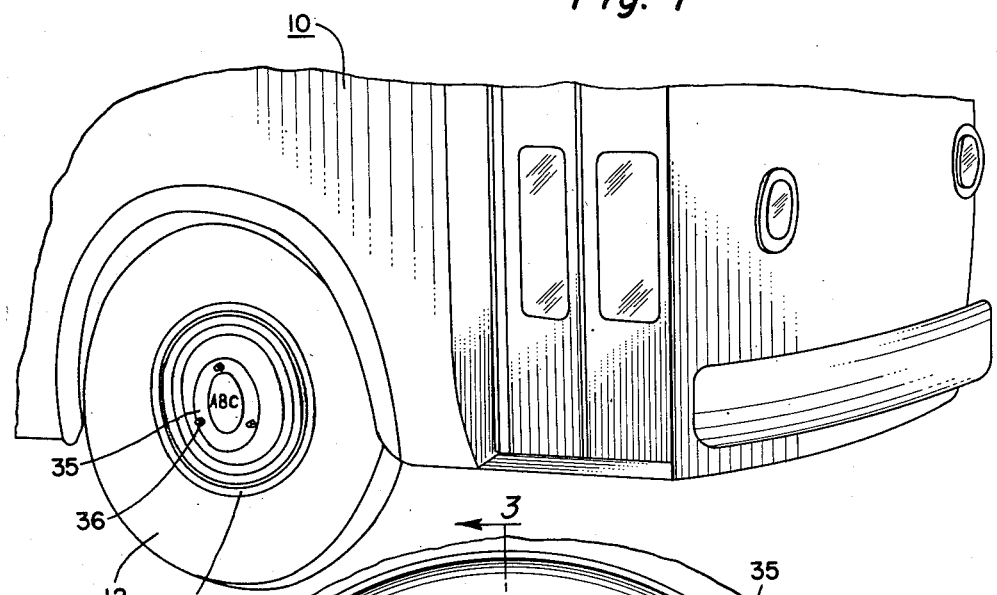
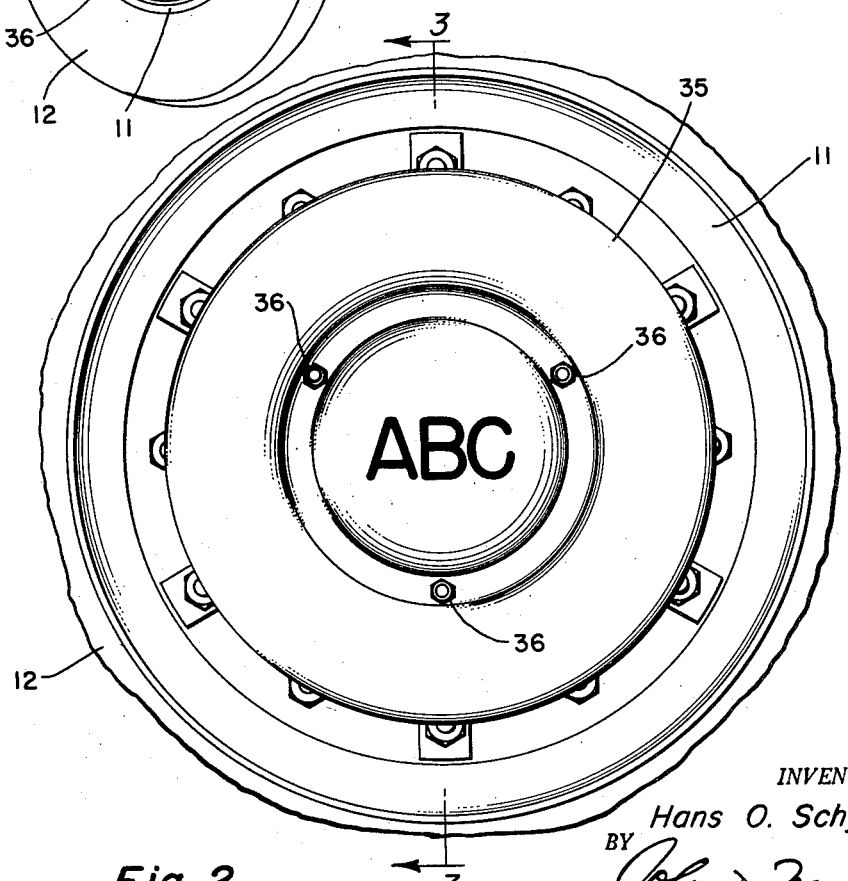
INVENTOR.
Hans O. Schjolin
BY
His Attorney INVENTOR.
Hans O. Schjolin
BY
His Attorney ated Feb. 26, 1957

2,782,871

WHEEL STRUCTURE WITH NON-ROTATING HUB CAP

Hans O. Schjolin, Birmingham, Mich., assignor to General Motors Corporation, Detroit, Mich., a corporation of Delaware Application September 25, 1953, Serial No. 382,247

1 Claim. (Cl. 188—18)

This invention relates to wheel structures for motor vehicles, and more particularly to the mounting of a wheel cover plate or hub cap on the wheel of a motor vehicle.

It is well-known that the conventional manner for mounting a wheel cover plate or hub cap currently used in the art of motor vehicles consists in mounting the hub cap or wheel cover plate directly to the wheel rim by suitable spring fastening devices. Such an arrangement encloses the wheel mounting bolts and the outboard end of the wheel axle, the cover plate rotating with the wheel.

It is an object of this invention to provide a structural arrangement of a wheel for a motor vehicle in which the hub cap or cover plate can be mounted stationarily relative to the wheel. This obviously provides an attractive appearing cover plate and one on which the name of the vehicle can be seen at any time irrespective of whether the vehicle is moving or standing still.

It is therefore the purpose of this invention to provide for stationary mounting of the hub cap or cover plate in a stationary manner on the out-board end of a non-rotatable wheel axle so that the cover plate will be stationary relative to the wheel at all times.

Further objects and advantages of the present invention will be apparent from the following description, reference being had to the accompanying drawings wherein a preferred form of the invention is clearly shown.

In the drawings:

Figure 1 is a perspective elevational view of a motor vehicle incorporating the stationary hub cap feature of this invention.

Figure 2 is a side elevational view of a wheel with the stationary hub cap mounted thereon.

Figure 3:
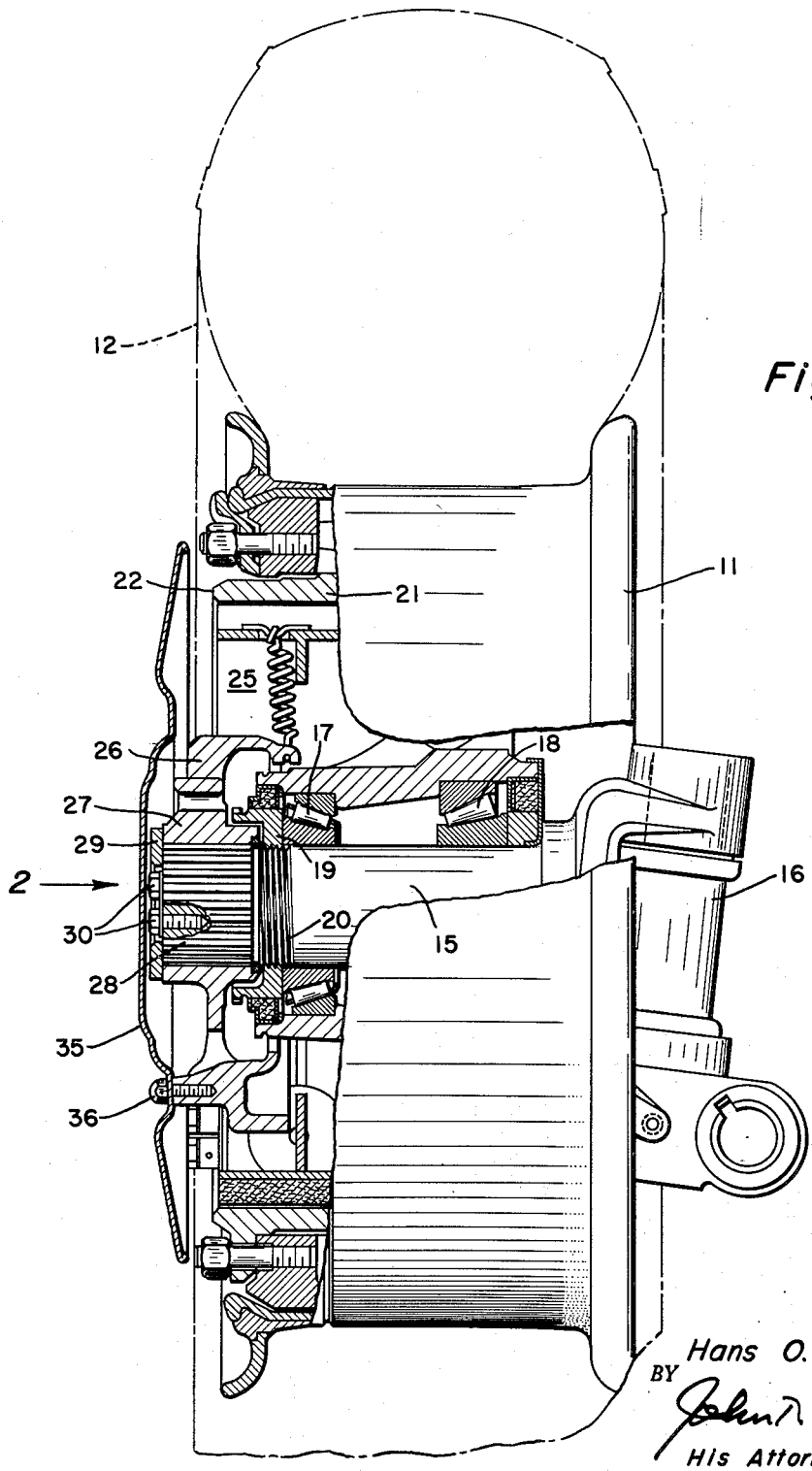
Figure 3 is a cross sectional view taken along line 3—3 of Figure 2.

The motor vehicle 10 illustrated in Figure 1 has the conventional wheel 11 carrying a tire 12. As illustrated, the wheel 11 is the front wheel of the motor vehicle 10.

The cover plate or hub cap 35 is carried upon the stationary mounting bolts 36, the cover plate 35 or hub cap being stationarily secured relative to rotation of the wheel in a manner hereinafter described.

In Figure 3 there is illustrated a cross sectional view of the front wheel of the motor vehicle. The wheel 11 is supported upon a non-rotatable axle 15 that extends from the kingpin bearing 16. The wheel 11 is supported by the roller bearings 17 and 18, the bearing 17 being mounted toward the out-board end of the axle 15 while the bearing 18 is mounted toward the in-board end of the axle.

A bearing retainer member 19 is threadedly received on the threaded portion 20 of the axle 15 to retain the bearings 17 and 18 and the wheel 11 in position on the axle 15. The wheel 11 includs a brake drum 21 that is suitably mounted on the wheel. The brake drum 21 has the out-board end 22 thereof open on the out-board side of the wheel.

A brake assembly 25 is positioned within the brake drum 21 and includes a supporting spider structure 26 that has a hub 27 carried upon the splined end 28 of the axle 15. The hub 27 of the brake spider structure is splined complementary to the splines in the axle 15 to prevent rotation of the spider structure 26 relative to the wheel, and thus maintain the brake assembly 25 stationary with the axle 15. The brake spider structure 26 is removably secured to the spline end 28 of the axle 15 by means of a retaining plate 29 held to the end of the axle 15 by the fastening bolts 30.

The brake spider structure 26, and the brake assembly 25 is thus removable from the out-board end of the axle 15 to gain access to the bearings 17 and 18 for repair and adjustment of the bearings.

The open end 22 of the brake drum 21 and the brake assembly 25 is closed against visual inspection from the out-board side of the wheel by a cover plate or hub cap 35 of any desired shape or form. As illustrated, the cover plate 35 is circular in its peripheral shape to conform to the circular shape of the wheel 11.

The cover plate 35 is carried on the axle 15 by the brake spider structure 26, bolts 36 being provided to removably retain the cover plate 35 upon the brake spider structure 26 and thus mount it stationary relative to the wheel.

The foregoing structure provides for stationary mounting of the cover plate 35 so that any lettering applied to the cover plate 35 will be visible and readable at any time whether the vehicle is standing or moving.

While the form of embodiment of the invention as herein disclosed constitutes a preferred form, it is to be understood that other forms might be adopted as may come within the scope of the appended claim which follows:

What is claimed is as follows:

A wheel structure with a non-rotating hub cap or cover plate for a vehicle, comprising, in combination, a non-rotatable wheel axle having a plurality of splines at an outboard end thereof, a wheel rotatably journalled on said axle, a brake drum mounted on said wheel and rotatable therewith, an internally splined hub affixed to the external splines on said axle, an annular spider member mounted rigidly on said hub, a brake shoe assembly supported by and operatively attached to said spider member, said shoe assembly being stationary and supported by said spider member relative to said brake drum rotatable with said wheel, and a hub cap attached to said spider member serving as a non-rotatable cover plate extending radially outwardly beyond said brake drum and spaced from the outboard end of said brake drum and said wheel to form an annular space therebetween and permit air to circulate through the space to the brake drum and shoe assembly.

References Cited in the file of this patent

UNITED STATES PATENTS

| 2,082,292 | Kendall | June 1, 1937 |
| 2,124,773 | Frank | July 26, 1938 |
| 2,580,001 | Butler | Dec. 25, 1951 |

FOREIGN PATENTS

| 412,355 | Great Britain | June 28, 1934 |